United States Patent [19]
Chapman et al.

[11] Patent Number: 5,320,989
[45] Date of Patent: Jun. 14, 1994

[54] BORON NITRIDE-CONTAINING BODIES AND METHOD OF MAKING THE SAME

[75] Inventors: Lloyd R. Chapman; Cressie E. Holcombe, Jr., both of Knox County, Tenn.

[73] Assignee: Orpac, Inc., Oak Ridge, Tenn.

[21] Appl. No.: 986,548

[22] Filed: Dec. 7, 1992

[51] Int. Cl.$^5$ ............................................. C04B 35/58
[52] U.S. Cl. ........................................................ 501/98
[58] Field of Search ..................... 57/293, 307, 309; 501/96, 97, 98, 127, 128, 154; 428/698

[56] References Cited

U.S. PATENT DOCUMENTS

| | | | |
|---|---|---|---|
| 2,763,620 | 9/1956 | Bugosh | 252/313 |
| 2,915,475 | 12/1959 | Bugosh | 252/313 |
| 3,031,418 | 1/1962 | Bugosh | 252/313 |
| 3,108,888 | 10/1963 | Bugosh | 106/62 |
| 3,141,786 | 7/1964 | Bugosh | 106/62 |
| 4,314,827 | 2/1982 | Leitheiser | 51/298 |
| 4,517,037 | 5/1985 | Francis et al. | 156/89 |
| 5,035,724 | 7/1991 | Pukari et al. | 51/309 |
| 5,090,970 | 2/1992 | Rue et al. | 51/309 |
| 5,120,683 | 6/1992 | Shaffer | 501/96 |

OTHER PUBLICATIONS

Lewis et al. "Microstructure and Thermomechanical Properties in Alumina-and Mollite-Boron-Nitride Particulate Ceramic-Ceramic Composites" Ceram. Eng. Sci. Proc. 2:719-727 (Nos. 7-8, 1981).

Tresuyatskii et al. "Effect of Boron Nitride Additional and the Properties of Alumino Silicate Refractories" Apr. 1986.

*Primary Examiner*—Helene Klemanski
*Assistant Examiner*—A. Wright
*Attorney, Agent, or Firm*—Pitts and Brittian

[57] ABSTRACT

A relatively chemically inert ceramic material produced from a clay-like mixture of boron nitride powder and aluminum oxide, where the aluminum oxide is derived from colloidal aluminum oxide, peptized aluminum oxide, or a dissolved aluminum salt. The clay-like mixture can be dried in a near net shape without cracking and then pressure-less sintered, or bulk dried. Alternatively, pressure-less sintered bodies can be easily machined to a given shape. The ceramic has properties very similar to those of boron nitride in that it resists damage from molten materials, has a high electrical resistance, has high strength at ambient and elevated temperatures, etc. A typical pressure-less sintered body is formed from a clay made with finely-divided boron nitride mixed with at least one of the listed sources of aluminum oxide such that the final sintered composition contains about 85 wt. % boron nitride.

23 Claims, No Drawings

BORON NITRIDE-CONTAINING BODIES AND METHOD OF MAKING THE SAME

TECHNICAL FIELD

The present invention relates generally to clay-like materials for producing boron nitride-containing bodies which have use from ambient to high temperatures. Applications of such materials include protective layers when handling molten metals, glasses, and salts, as well as for processing plastics. Further applications include those requiring special lubricating qualities and those requiring the special electrical, thermal and physical properties of boron nitride. More specifically, the invention relates to a boron nitride-containing clay-like body that can be easily fabricated as a clay into desired shapes followed by drying and pressureless sintering to produce sintered "near net shapes", or sintered shapes that can be easily machined to create bodies for the various applications.

BACKGROUND ART

In processes involved with molten metals, glasses, slags, salts, etc., it is necessary to protect structural components from the action of these high temperature molten materials. It is conventional practice to interpose some type of relatively inert material between the structural components and the molten mass. Typically, this relatively inert material (or liner) is a ceramic paint often containing aluminum oxide, silicon dioxide, silicates, and sometimes boron nitride. Other liners are component pieces of the liner material. Many of these liner materials are not completely chemically inert and, additionally, since thin layers are used, can be easily mechanically damaged. Reaction between the molten material and the liner is particularly common when the liner contains silicon dioxide or silicates. The prior art liners must be frequently replaced as by recoating or relining. When monolithic liners are utilized, these are relatively difficult to fabricate into the complex shapes that are required for some applications.

The difficulty in fabricating solid boron nitride shapes is well known. Generally such shapes have only been obtained by hot pressing of boron nitride powder to yield high density material. The boron nitride must be hot pressed at very high temperatures (typically above 1800° C.) into round logs from which the desired shape must be machined. Rectangular shapes have been produced but with some difficulty. Also, the length-to-diameter ratio is typically required to be less than one in order to get uniformity of densification. Such hot pressing limitations mandate that intricate shapes cannot be produced directly. Because of the cost and difficulty in achieving uniform and adequate densification for large parts, cylindrical logs are limited in diameter and length to about fourteen inches.

Other materials in common use for inert ceramic applications include aluminum oxide and zirconium oxide. These materials are not easily machined, even less so than the boron nitride. Additionally, the production of solid shapes requires either hot pressing or high temperature (over 1500° C.) pressureless sintering. Therefore, their use for complex shapes is extremely limited.

Ceramic materials have many other uses, including applications where the material needs to achieve certain desired qualities. These qualities include high lubricity and good electrical resistance, high thermal conductivity, good mechanical properties and good chemical properties. For many of the applications, these properties must be available at both ambient and high temperatures in most any atmosphere. For these applications, the materials of interest are aluminum oxide, zirconium oxide, or boron nitride. However, the difficulty of fabricating these materials into complex shapes restricts their use significantly.

References that may have relevance to the present invention are U.S. Pat. No. 2,763,620 issued to J. Bugosh on Sep. 18, 1956; 2,915,475 issued to J. Bugosh on Dec. 1, 1959; 3,031,418 issued to J. Bugosh on Apr. 24, 1962; 3,108,888 issued to J. Bugosh on Oct. 29, 1963; 3,141,786 issued to J. Bugosh on Jul. 21, 1964; and 4,314,827 issued to M. A. Leitheiser, et al on Feb. 9, 1982.

Accordingly, it is an object of the present invention to develop a clay-like material that can produce a ceramic for use in contact with molten metals, glasses, slags, salts, plastics and the like that has a chemical resistance to reactions with these materials.

Further, it is an object of the present invention to develop a clay-like material which, upon drying, exhibits good lubricity as well as good electrical, thermal and mechanical properties both at ambient and high temperature.

Another object of the present invention is to develop a pressureless-sintered clay-like material that can be readily fabricated into the shapes that are required for a ceramic in applications wherein the ceramic material is in contact with molten metals, glasses, slags, salts, plastics, and similar materials.

A further object of the present invention is to provide a pressureless-sintered boron nitride-containing ceramic in near-to-net shape for use in applications wherein contact is made with molten metals, glasses, slags, salts and similar materials, and for applications where such a ceramic needs to have high lubricity, high electrical resistance, high thermal conductivity and good mechanical strength both at ambient and elevated temperatures.

It is also an object of the present invention to provide a method for the preparation of boron nitride containing clay-like material useful for producing pressureless sintered boron nitride-containing bodies that can be fabricated into intricate shapes by conventional fabricating processes.

These and other objects of the present invention will become apparent upon a consideration of the detailed description hereinafter.

DISCLOSURE OF THE INVENTION

In accordance with the present invention, very finely divided boron nitride powder is mixed with a source of aluminum oxide to act as a binder phase. The boron nitride powder typically has an average agglomerate size of about two to four micrometers diameter, with actual particle size of about one micrometer. The surface area of the boron nitride powder is typically five to ten $m^2/g$. A product that is at least 50 vol. % boron nitride is required to achieve the desired non-wetting characteristics when the product is used to contain molten materials. With the aluminum oxide as the secondary material, the boron nitride composition is achieved with 36 wt. % BN. Thus, the range of BN for the present invention, when using $Al_2O_3$, is 36 wt. % to nearly 100 wt. % (at least 95%). An aluminum oxide that is colloidal or peptized, or aluminum salts, coat the individual boron nitride particles to provide the plasticity of the product. Typically the proportions are such as to produce a dried product having about 85 wt. % boron nitride and 15 wt. % aluminum oxide. This produces a clay-like paste which is then dried and optionally fired before use to temperatures in the range of about 500° to about 1000° C., and typically about 700° C. This produces a bulk body of a density about 60% of theoretical such that the material can be shaped by conventional cutting methods. Alternatively, the paste can be formed into any desired shape, then dried and fired. The density, after sintering, is typically 1.4 to 1.6 g/cm$^3$, which is about 60 to 70% of the average theoretical density of a BN:Al$_2$O$_3$ mixture with 85 wt. % BN. At different ratios of constituency, porosity in these bodies can be varied from about 50 to about 20%.

BEST MODE FOR CARRYING OUT THE INVENTION

A dense boron nitride-containing body was prepared by mixing 75 g. of colloidal aluminum oxide (typically Nyacol AL-20 watery liquid) with 85 g. of finely divided boron nitride powder. As used herein, colloidal refers to small particles, typically equal to or less than 0.05 micrometers (equal to or less than 500 Angstroms), dispersed in water as sols or hydrosols. The BN powder was about two to four micrometers in particulate size, and had a surface area typically about five to ten m$^2$/g. The colloidal aluminum oxide added at this amount allowed the material to behave in a plastic manner, like a thick clay-like mass. Any air was removed by a vacuum pug mill, as will be known by persons skilled in the art. The product of the mill was allowed to completely dry at about room temperature, and unexpectedly resulted in an uncracked body. The thickness of dried blocks can reach 90 mm or greater without cracking. Any desired shape, in addition to the blocks, can be fabricated. Shapes and sizes are unlimited since pieces can be joined using "seaming" techniques generally known for clays.

After thorough drying, which takes a few hours to a few days depending upon the thickness and size of the body, the body was heated slowly to a pressureless sintering temperature. Above about 500° C., all volatiles were removed such that the body was essentially boron nitride and aluminum oxide. The above-identified quantities resulted in about 85 wt. % boron nitride and 15 wt. % aluminum oxide. This body was then sintered in air up to about 700° C., resulting in a body having a density of about 1.4 to 1.6 g/cm$^3$. This sintered body can be cut or otherwise shaped to any desired shape. As used herein, the term "shaping" or "shaped" is meant to include sawing, drilling carving, grinding, machining, rasping and like mechanical operations. Alternatively, the clay-like mixture can be fabricated into even intricate shapes before drying and sintering since very little shrinkage occurred during drying. Thus, the body can be formed to "near-net" shape. Typical forming techniques for the clay-like material prior to drying include, but are not limited to, ram pressing, extrusion, and hand forming.

It is well known that boron nitride itself is very difficult to bond together, typically requiring hot pressing at temperatures in excess of 1800° C. Thus, in the present invention it is the aluminum oxide that forms a network linkage covering each boron nitride particle and bonding the same to form the hard sintered body. This sintered body is lubricous and easily machined while maintaining the basic properties of boron nitride. The body has high electrical resistance and high thermal conductivity. Although the density, as a percentage of theoretical density is a relatively low 60 to 70%, the body is quite tough and strong and compares favorably to commercial graphite bodies. The sintered BN—Al$_2$O$_3$ body has essentially the same hot strength as a commercial hot pressed BN body. Room temperature strength is also comparable for both materials. Accordingly, the product of the present invention provides a ceramic that can be pressureless sintered at the relatively low temperatures of about 500° to about 1000° C. (typically, about 700° C.). The ceramic can be prepared to near "net" shape (desired final shape) since shrinkage is low, typically about 12%. Also, blocks can be readily machined into desired shapes: the machinability being about equal to that as commercial graphite.

The present invention was carried out successfully with another source of aluminum oxide sol or hydrosol. For this 24 g. of the finely divided boron nitride powder (same as used with the colloidal aluminum oxide) was intimately mixed with 78 g. of a peptized aluminum oxide monohydrate liquid as prepared by mixing 5 g. of aluminum oxide monohydrate into 75 g. of water and adding 2.5 g. of concentrated nitric acid while stirring. This peptizing is well known in the art (see, for example, above-cited U.S. Pat. No. 4,314,827) as means to create a dispersed phase of ultrafine particulate material similar to, but somewhat different than, colloidal material. The resultant clay-like mixture of these two materials was allowed to dry into a non-cracked mass. This was followed by sintering at about 500° to about 1000° C. (typically about 700° C.), resulting in a BN—Al$_2$O$_3$ ceramic having about 85 wt. % BN and 15 wt. % aluminum oxide.

The present invention was also carried out using aluminum oxide dissolved in the form of a salt. In this example, 85 g. of the finely divided boron nitride powder was intimately mixed with 110 g. of aluminum nitrate [Al(NO$_3$)$_3$.9H$_2$O ] with enough water (about 175 g.) to dissolve the salt. The water was allowed to evaporate until the mixture became clay-like. The clay-like material was hand-formed into a bar and dried thoroughly, after which the piece was slowly heated to allow dissociation of the water and nitrate portions of the salt. The heating was continued to about 500° C., and then up to about 700° C. This variation of the invention also yielded a pressureless-sintered ceramic with about 15 wt. % aluminum oxide.

In order to demonstrate that the aluminum oxide needs to be colloidal, peptized or dissolved, a test was made using aluminum oxide powder of the same size as in the colloidal form. This was polishing grade aluminum oxide, Linde B, having a 0.05 micrometer powder. A 15 g. amount of this powder was mixed with 85 g. of the finely divided boron nitride powder as used in the other tests, with enough water to form a clay-like substance. There was sufficient plasticity so as to form a bar; however, there was no cohesiveness upon drying and heating at the elevated temperatures used in the other tests and the product easily crumbled.

Additional tests demonstrated that there can be a wide variation in the amount of colloidal aluminum oxide that can be accommodated in order to create the clay-like material. However, since the end product is to have properties more closely resembling BN than the aluminum oxide, the minimum quantity is about 50 vol%. Thus, the minimum amount of BN is about 36 wt. % (equivalent to the 50 vol. %). This equates to about 36 g. BN and 320 g. colloidal aluminum oxide since the colloidal aluminum oxide contains 20 wt. % aluminum oxide when totally dehydrated. It will be recognized, however, that a product containing nearly 100 wt. % BN can be prepared according to the present invention.

The present invention, as set forth above produce a moderately porous body with the proportions in the final body being governed by the proportions of the starting materials. The porosity of the body can typically vary from about 50% to about 20%. Alternative to the colloidal aluminum oxide, peptized aluminum oxide and aluminum nitrate, any dissolved form of aluminum that yields aluminum oxide on firing can be utilized to achieve the clay-like structures. One such form is aluminum lactate; however, some other aluminum salts, such as aluminum chlorides, sulfates, etc. are difficult to dissociate into aluminum oxide without special treatment (such as long firing in oxygen).

It will also be recognized that higher levels of aluminum oxide can be achieved by adding finely divided powder of aluminum oxide to colloidal or peptized aluminum oxide, or dissolved aluminum, these providing for adequate coating of the powders.

From the foregoing, it will be understood by persons skilled in the art that the present invention provides a method of producing a relatively dense ceramic of boron nitride and aluminum oxide. This ceramic has basically the properties of boron nitride and, as such, has resistance to attack by molten materials, has high electrical resistance, high thermal conductivity, and high strength at ambient and elevated temperatures. The ceramic can be premolded from a clay-like material into any desired shape so as to be pressureless sintered into near net shape. Alternatively, the ceramic can be easily machined into any desired shape from blocks or other configurations. Pieces can be joined, prior to elevated temperature sintering, using conventional clay joining techniques.

Although certain proportions of constituents are given herein for the purpose of illustrating the invention, these values are not to limit the present invention. Rather, the invention is to be limited only by the appended claims and their equivalents.

We claim:

1. A method of preparing a body containing boron nitride, which comprises the steps:
    preparing an intimate mixture of finely divided boron nitride powder with a source of aluminum oxide selected from the group consisting of a water-based colloidal aluminum oxide, peptized aluminum oxide monohydrate liquid, and an aqueous solution of an aluminum salt that can be converted to aluminum oxide at temperatures below about 1000° C.; and
    drying said intimate mixture to remove substantially all water to form an uncracked dry cake of said body containing said boron nitride.

2. The method of claim 1 further comprising the steps:
    shaping a product of said drying step into a shape; and
    pressureless sintering said shape.

3. The method of claim 1 wherein said finely divided boron nitride has a particulate size of about two to four micrometers and a surface area of about five to ten m²/g.

4. The method of claim 1 wherein said source of aluminum oxide is a water-based colloidal aluminum oxide.

5. The method of claim 1 wherein said source of aluminum oxide is a peptized aluminum oxide monohydrate liquid.

6. The method of claim 1 wherein said source of aluminum oxide is an aqueous solution of an aluminum salt.

7. The method of claim 2 wherein said drying step is carried out at room temperature, and said pressureless sintering step is carried out at about 500° to about 1000° C.

8. The method of claim 1 wherein said intimate mixture contains from about 36 to about 95 wt. % boron nitride.

9. A method of preparing a body containing boron nitride, which comprises the steps:
    preparing an intimate mixture of finely divided boron nitride with a source of aluminum oxide selected from the group consisting of a water-based colloidal aluminum oxide, peptized aluminum oxide monohydrate liquid, and an aqueous solution of an aluminum salt that can be easily converted to aluminum oxide by heating to a temperature of up to about 500° to about 1000° C.;
    drying said intimate mixture to remove substantially all water to form an uncracked dry cake containing said boron nitride; and
    pressureless sintering said uncracked cake at a temperature of about 500° to about 1000° C.

10. The method of claim 9 wherein said dried cake is shaped into a shape prior to said pressureless sintering step.

11. The method of claim 9 wherein a product of said pressureless sintering step is shaped into a shape.

12. The method of claim 9 wherein a product of said pressureless sintering step contains from about 36 to about 95 wt. % BN.

13. The method of claim 9 wherein said source of aluminum oxide is a water-based colloidal aluminum oxide.

14. The method of claim 9 wherein said source of aluminum oxide is a peptized aluminum oxide monohydrate liquid.

15. The method of claim 9 wherein said source of aluminum oxide is an aqueous aluminum nitrate solution.

16. The method of claim 9 wherein said boron nitride has a particulate size of about 2 to four micrometers and a surface area of about five to ten m²/g.

17. A method of producing a machinable composite body of boron nitride particles coated with aluminum oxide, said body having a porosity of from about 20 to about 50%, said method comprising the steps:
    preparing an intimate mixture of finely divided boron nitride powder with a source of aluminum oxide selected from the group consisting of a water-based colloidal aluminum oxide, peptized aluminum oxide monohydrate liquid, and an aqueous solution of aluminum nitrate, said boron nitride being present at about 36 wt. % to about 95 wt. % in said intimate mixture;
    drying said intimate mixture at about ambient temperature to remove substantially all water to form an uncracked cake containing said boron nitride; and pressureless sintering said dried cake at a temperature of about 500 to about 1000° C. in an air atmosphere to form said machinable composite body.

18. The method of claim 17 further comprising the step of shaping said uncracked cake into a shape prior to said pressureless sintering step.

19. The method of claim 17 further comprising the step of shaping said machinable composite into a shape subsequent to said pressureless sintering step.

20. A solid body consisting essentially of about 36 to about 95 wt. % boron nitride particles bonded with aluminum oxide, said body having a porosity of from about 20 to about 50%, said aluminum oxide derived from a group consisting of a water-based colloidal aluminum oxide, a peptized aluminum oxide monohydrate liquid, and an aqueous solution of an aluminum salt that can be converted to aluminum oxide at a temperature of about 500° to about 1000° C.

21. The solid body of claim 20 wherein said boron nitride is present from about 36 to about 95 wt. %.

22. The solid body of claim 21 wherein said boron nitride is present at about 85 wt. %.

23. A material suitable for forming a body, said material prepared from an intimate mixture of boron nitride powder and a source of aluminum oxide, said source of aluminum oxide selected from the group consisting of a water-based colloidal aluminum oxide, peptized aluminum oxide monohydrate liquid, and an aqueous solution of an aluminum salt, said material containing from about 36 to about 95 wt. % boron nitride.

* * * * *